Patented Mar. 15, 1938

2,110,870

UNITED STATES PATENT OFFICE 2,110,870

OXIDIZING ELEMENTAL PHOSPHORUS

Harry A. Curtis, Knoxville, Tenn.

No Drawing. Application July 14, 1936,
Serial No. 90,538

3 Claims. (Cl. 23—165)

(Granted under the act of March 3, 1883, as
amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

This invention relates to a method for volatilizing and subsequently oxidizing elemental phosphorus.

One of the objects of this invention is to provide an effective method for the volatilization of elemental phosphorus. Another object of this invention is to provide a means for the volatilization of elemental phosphorus from a crude commercial mixture containing the same without the necessity of the removal of foreign matter from the mixture before volatilization. Other objects of this invention include the provision of a means for producing a gaseous mixture containing phosphorus pentoxide from elemental phosphorus suitable for making phosphoric acid and phosphates.

I have discovered a new and improved method for volatilizing and oxidizing elemental phosphorus by admitting either the solid or liquid elemental phosphorus to the surface of a molten bath of calcium metaphosphate located on the hearth of the combustion chamber to volatilize the elemental phosphorus and by admitting at least a sufficient quantity of air to oxidize all the phosphorus to phosphorus pentoxide into the combustion chamber to form a hot gaseous mixture containing the phosphorus pentoxide.

It is evident that there are numerous factors which will influence conditions for the most satisfactory operation of my invention, the actual limits of which cannot be established except by a detailed study of each set of raw materials and the intermediate and finished products involved.

The elemental phosphorus may be produced by any known means such as by the reduction of a charge of phosphate rock, silica and coke in a blast furnace to produce a phosphate reduction furnace gas containing 0.7 to 1.0% of elemental phosphorus or by the reduction of a charge of phosphate rock, silica and coke in an electric furnace to form a phosphate reduction furnace gas containing 8 to 10% elemental phosphorus. The separation of elemental phosphorus from such phosphate reduction furnace gas by the usual means of condensation results in the production of a crude mixture of elemental phosphorus associated with some fine phosphate rock, silica and coke which become entrained in the phosphate reduction furnace gas leaving the reduction furnaces. With indirect condensation of the elemental phosphorus the resulting crude mixture is substantially free from water but with the direct condensation resulting from the use of water or aqueous solutions, the resulting mixture of elemental phosphorus and impurities carries a substantial quantity of water. In some instances it may be desirable to separate the elemental phosphorus contained in either a dry or wet crude mixture to produce substantially pure liquid or solid elemental phosphorus. This invention contemplates the use of solid or liquid elemental phosphorus or crude mixtures containing the same as indicated above with the latter being preferred in order to secure the greatest economic advantages inherent in my process.

When substantially pure elemental phosphorus is oxidized a major portion of the elemental phosphorus appears in the gaseous oxidation products as phosphorus pentoxide while invariably a minor portion of the phosphorus remains as a residue in the form of oxidized phosphorus compounds of unknown composition. In other words, the ordinary, direct oxidation of all of the elemental phosphorus is not entirely effective in the oxidation of all of the elemental phosphorus to phosphorus pentoxide. Furthermore, under these same conditions, the presence of foreign materials, such as fine phosphate rock, silica and coke, together with water in those cases where a wet phosphorus sludge is used, seriously aggravates this condition in respect to the unvolatilized residue since the foreign materials cause excessive deposits in the volatilization and oxidation zones.

I have found that when solid or liquid elemental phosphorus, or mixtures containing the same, is dropped on the surface of molten calcium metaphosphate on the hearth of a combustion chamber, the elemental phosphorus contained in such mixtures is substantially completely vaporized, and, by admitting at least a sufficient quantity of air to oxidize all of the elemental phosphorus in the charge, the elemental phosphorus so volatilized oxidizes directly to phosphorus pentoxide with the production of a hot gaseous mixture of sufficient flame temperature and thermal content as to maintain the calcium metaphosphate in a fused condition. The hot gaseous mixture containing the phosphorus pentoxide may be withdrawn from the combustion chamber and used to produce phosphoric acids or phosphates. Portions of the fused calcium metaphosphate on the hearth of the combustion chamber are withdrawn periodically as the foreign matter which is carried by the crude elemental phosphorus and the non-volatile oxidized phosphorus compounds accumulates. The portions of the calcium metaphosphate and impurities so withdrawn are quenched and form a valuable fertilizer material.

As the portions of fused calcium metaphosphate are withdrawn from the hearth of the combustion chamber additional portions of calcium metaphosphate are admitted to the hearth of the furnace as required.

It will be seen, therefore, that this invention actually may be carried out by the modifications of certain details without departing from its spirit or scope.

I claim:

1. Process of volatilizing and oxidizing solid or liquid phosphorus from crude mixtures containing the same, which comprises, admitting the elemental phosphorus to the surface of molten calcium metaphosphate on the hearth of a combustion chamber to volatilize the elemental phosphorus, admitting at least a sufficient quantity of air to oxidize all of the phosphorus to phosphorus pentoxide into the combustion furnace to form a hot gaseous mixture containing substantially all of the phosphorus pentoxide, admitting calcium metaphosphate as required to the hearth of the chamber to supply a heated surface for the volatilization of the admitted elemental phosphorus, withdrawing the fused calcium metaphosphate and impurities from the hearth of the chamber, and withdrawing the hot gaseous mixture containing substantially all of the phosphorus pentoxide from the combustion chamber.

2. Process of volatilizing and oxidizing solid or liquid elemental phosphorus from crude mixtures containing the same, which comprises, admitting the elemental phosphorus to the surface of molten calcium metaphosphate on the hearth of a combustion chamber to volatilize the elemental phosphorus, admitting at least a sufficient quantity of air to oxidize all of the phosphorus to phosphorus pentoxide into the combustion furnace to form a hot gaseous mixture containing substantially all of the phosphorus pentoxide, and withdrawing the hot gaseous mixture containing substantially all of the phosphorus pentoxide from the combustion chamber.

3. Process of volatilizing and oxidizing solid or liquid elemental phosphorus from crude mixtures containing the same, which comprises, admitting the elemental phosphorus to the surface of molten calcium metaphosphate in a liquid confining zone surrounded by a gas confining zone to volatilize the elemental phosphorus; admitting at least a sufficient quantity of air to oxidize all of the phosphorus to phosphorus pentoxide into the gas confining zone to form a hot gaseous mixture containing the phosphorus pentoxide; and withdrawing the hot gaseous mixture containing substantially all of the phosphorus pentoxide from the vicinity of the liquid confining zone occupied by the molten calcium metaphosphate.

HARRY A. CURTIS.